(12) United States Patent
Mizuno et al.

(10) Patent No.: US 7,425,085 B2
(45) Date of Patent: Sep. 16, 2008

(54) VEHICLE HEADLIGHT APPARATUS

(75) Inventors: Ryu Mizuno, Kariya (JP); Kazuhiko Nakashima, Nishikamo-gun (JP)

(73) Assignee: Denso Corporation (JP)

( * ) Notice: Subject to any disclaimer, the term of this patent is extended or adjusted under 35 U.S.C. 154(b) by 4 days.

(21) Appl. No.: 11/448,764

(22) Filed: Jun. 8, 2006

(65) Prior Publication Data

US 2006/0291228 A1 Dec. 28, 2006

(30) Foreign Application Priority Data

Jun. 9, 2005 (JP) ............................. 2005-169834

(51) Int. Cl.
*F21S 8/10* (2006.01)
(52) U.S. Cl. .................. 362/465; 362/509; 362/466; 362/523; 362/467; 362/464; 701/49
(58) Field of Classification Search ................ 362/465, 362/509, 466, 523; 701/49; 360/464, 467
See application file for complete search history.

(56) References Cited

U.S. PATENT DOCUMENTS

| 6,778,892 | B2 | 8/2004 | Horii et al. | |
|---|---|---|---|---|
| 6,969,183 | B2 * | 11/2005 | Okubo et al. | 362/466 |
| 2005/0027419 | A1 * | 2/2005 | Horii et al. | 701/49 |
| 2005/0157509 | A1 * | 7/2005 | Tsukamoto | 362/465 |

FOREIGN PATENT DOCUMENTS

JP 11-321441 11/1999

\* cited by examiner

*Primary Examiner*—Stephen F. Husar
*Assistant Examiner*—Jessica L McMillan
(74) *Attorney, Agent, or Firm*—Nixon & Vanderhye PC

(57) ABSTRACT

A vehicle headlight apparatus includes a headlight and an actuator. The actuator horizontally changes a lighting direction of the headlight. The vehicle headlight apparatus drives the actuator such that the actuator horizontally changes the lighting direction of the headlight based on a target swivel angle that is determined based on a travel condition, upon the occurrence of one of the following conditions: (a) the vehicle headlight apparatus detects a dark road section located on a downstream side of a current position of a vehicle, or (b) the headlight is switched on.

30 Claims, 5 Drawing Sheets

VEHICLE HEADLIGHT APPARATUS

CROSS REFERENCE TO RELATED APPLICATION

This application is based on and incorporates herein by reference Japanese Patent Application No. 2005-169834 filed on Jun. 9, 2005.

BACKGROUND OF THE INVENTION

1. Field of the Invention

The present invention relates to a vehicle headlight apparatus, which performs a swivel operation that changes an optical axis of a headlight in a horizontal direction correspondingly to a steering operation.

2. Description of Related Art

Conventionally, there has been proposed an adaptive front-lighting system (AFS) that radiates light in a direction, which a driver of a vehicle desires. The AFS is realized by changing a direction of radiation (i.e., an optical axis) of a headlight of the vehicle. The AFS includes a leveling mechanism and a swivel mechanism for changing a direction of the optical axis of the headlight. Here, the leveling mechanism vertically changes the direction of the optical axis, and the swivel mechanism horizontally changes the direction of the optical axis.

In the swivel mechanism of the above functions, a target swivel angle is computed based on inputted data, such as a headlight switch signal, a vehicle speed and a steering angle. Then, there is preformed an operation for driving an actuator that changes the optical axis of the headlight such that the optical axis corresponds to the target swivel angel. For example, in a case of a right turn, the optical axis of the headlight is changed to a right direction. Also, in a case of a left turn, the optical axis is changed to a left direction. Therefore, this improves the viewability in a vehicle drive direction at night travel (see Japanese Unexamined Patent Publication No. 2003-72460 corresponding to U.S. Pat. No. 6,778,892).

However, the conventional swivel mechanism has a disadvantage. The conventional swivel mechanism starts driving the actuator based on the headlight switch signal so that the optical axis of the headlight is changed to set at the target swivel angle at one stroke when the headlight is turned on during the vehicle travels on a curve. For example, here is supposed a vehicle, which has an automatic lighting apparatus for automatically lighting the headlight when a travel environment indicates a predetermined darkness. When this vehicle travels into a tunnel, which curves to the right, the headlight is automatically turned on, and simultaneously the optical axis of the headlight is widely moved to the right.

SUMMARY OF THE INVENTION

The present invention is made in view of the above disadvantages. Thus, it is an objective of the present invention to provide a vehicle headlight apparatus, which obviates or mitigates at least one of the above disadvantages.

To achieve the objective of the present invention, there is provided a vehicle headlight apparatus, which includes a headlight, an actuator, a swivel controlling means, a dark road section detecting means and a headlight determining means. The headlight lights a downstream side of a current position of a vehicle in a traveling direction of the vehicle. The actuator horizontally changes a lighting direction of the headlight. The swivel controlling means drives the actuator. The dark road section detecting means detects a dark road section, which is located on the downstream side of the current position, wherein the dark road section is a segment of a road with a predetermined darkness; the segment of the road extending for a predetermined distance. The headlight determining means determines whether the headlight lights. The swivel controlling means drives the actuator such that the actuator horizontally changes the lighting direction of the headlight based on a target swivel angle, which is determined based on a travel condition, when one of the following conditions is satisfied. A first condition is that the dark road section detecting means detects the dark road section, which is located on the downstream side of the current position of the vehicle. A second condition is that the headlight determining means determines that the headlight lights.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PREFERRED EMBODIMENT

First Embodiment

The first embodiment will be described with reference to accompanying drawings.

Figure 1:
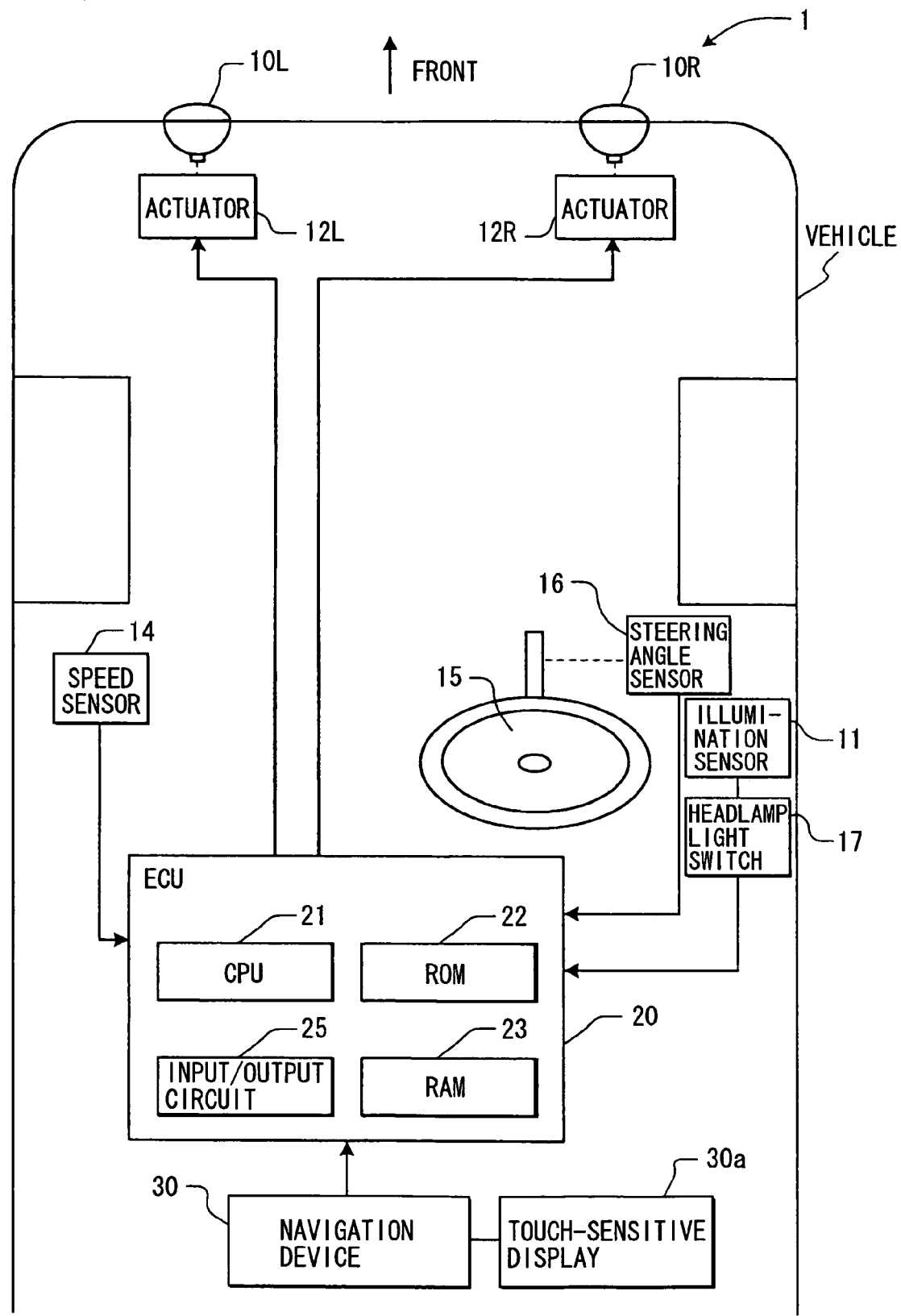
FIG. 1 is a block diagram showing a system structure of a vehicle headlight apparatus of a first embodiment of the present invention.

In FIG. 1, a left headlamp 10L and a right headlamp 10R are provided on a front side of a vehicle to serve as a headlight. An illumination sensor 11 is provided in an interior of the vehicle to detect an illumination of a travel environment of the vehicle. When the illumination sensor 11 detects that the travel environment indicates darker than a predetermined darkness (i.e., a degree of brightness in the travel environment is less than a predetermined value), the headlamps 10L, 10R are automatically turned on by a headlamp light switch 17. Also, when the illumination sensor 11 detects that the travel environment indicates brighter than the predetermined darkness (i.e., the degree of brightness in the travel environment is larger than the predetermined value), the headlamps 10L, 10R are automatically turned off by the headlamp light switch 17. Here, a headlight of the present invention includes the headlamps 10L, 10R, and an automatic light controlling means of the present invention includes the headlamp light switch 17.

An electronic control unit (ECU) 20 includes a CPU 21, a ROM 22, a RAM 23 and an input/output circuit 25 to operates a drive control of each of the actuators 12L, 12R for the corresponding headlamp 10L, 10R. Here, the CPU 21 serves as a central processing unit for performing well-known various processes. The ROM 22 stores a control program. The RAM 23 stores various data.

A navigation device 30 includes a storage device (not shown) and a touch-sensitive display 30a. The storage device stores road information. The touch-sensitive display 30a is so located in an interior of the vehicle that the touch-sensitive display 30a is easily seen by an occupant (driver) seated on a driving seat. The navigation device 30 utilizes a global positioning system (GPS) to estimate a traveling position (i.e., a computed current position) of the vehicle. The navigation device 30 displays a map and the estimated traveling position in the touch-sensitive display 30a. The road information stored by the navigation device 30 includes a location of a dark road section (e.g., a road in a tunnel, an underpass of a bridge, an underpass of an overhead crossing) such that the navigation device 30 can detect the dark road section, which is located ahead of the estimated traveling position of the vehicle (i.e., which is located on a downstream side of the current position of the vehicle in a traveling direction). Here, the dark road section is defined as a segment of a road with a predetermined darkness (i.e., the degree of brightness of the segment of the road is less than a predetermined value). Also, the segment of the road extends to a predetermined distance. The navigation device 30 serves as a dark road section detecting means of the present embodiment.

The ECU 20 receives an outputs signal supplied by a speed sensor 14, which senses a vehicle speed, an outputs signal supplied by a steering angle sensor 16, which senses a steering angle of a steering wheel 15, an output signal supplied by the headlamp light switch 17, which turns on the headlamps 10L, 10R, information supplied by the navigation device 30 and other various sensor signals. Here, the information supplied by the navigation device 30 includes the location of the dark road section and the length thereof. Then, the ECU 20 computes a target swivel angel based on the output signal supplied by the speed sensor 14 and the output signal supplied by the steering angle sensor 16. Here, the target swivel angle $\theta$ indicates an angle between an adjusted optical axis of the headlamp 10L, 10R and a longitudinal axis (fore-and-aft axis) of the vehicle when adjustment of the direction of the headlamp 10L, 10R is completed by the actuator 12L, 12R. Each of the actuators 12L, 12R is driven upon receiving an output signal based on the target swivel angle such that a direction of each optical axis of the headlamps 10L, 10R is adjusted to a direction of a visual axis of the occupant. Here, the visual axis of the occupant relates to a steering operation of the vehicle. In the present specification, explanation of the computing method of the target swivel angle based on the vehicle speed and the steering angle is omitted, because the computing method thereof is similar to the conventional well-known method.

Figure 2:
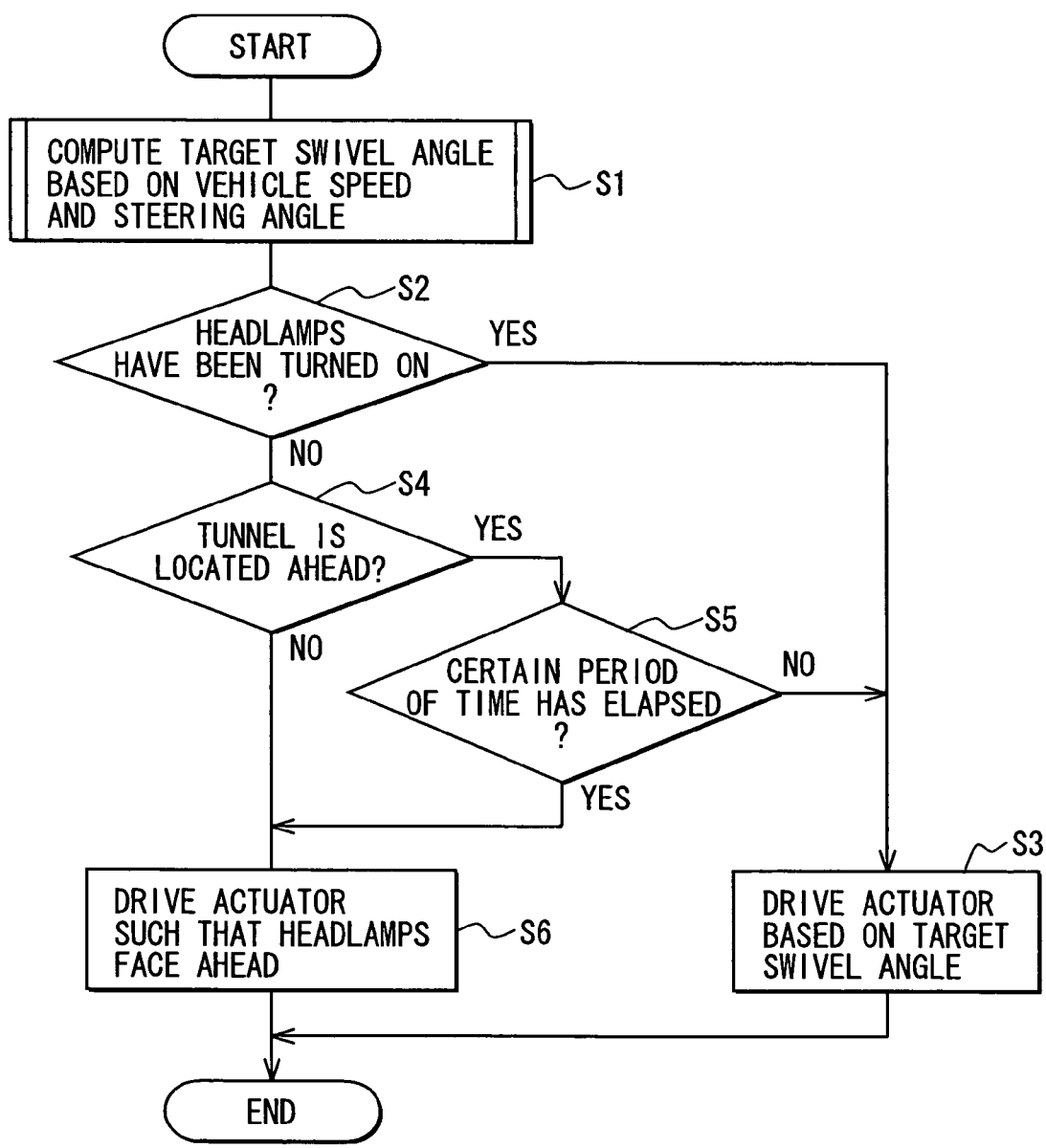
FIG. 2 is a flowchart showing a control processing of the vehicle headlight apparatus.
Figure 3:
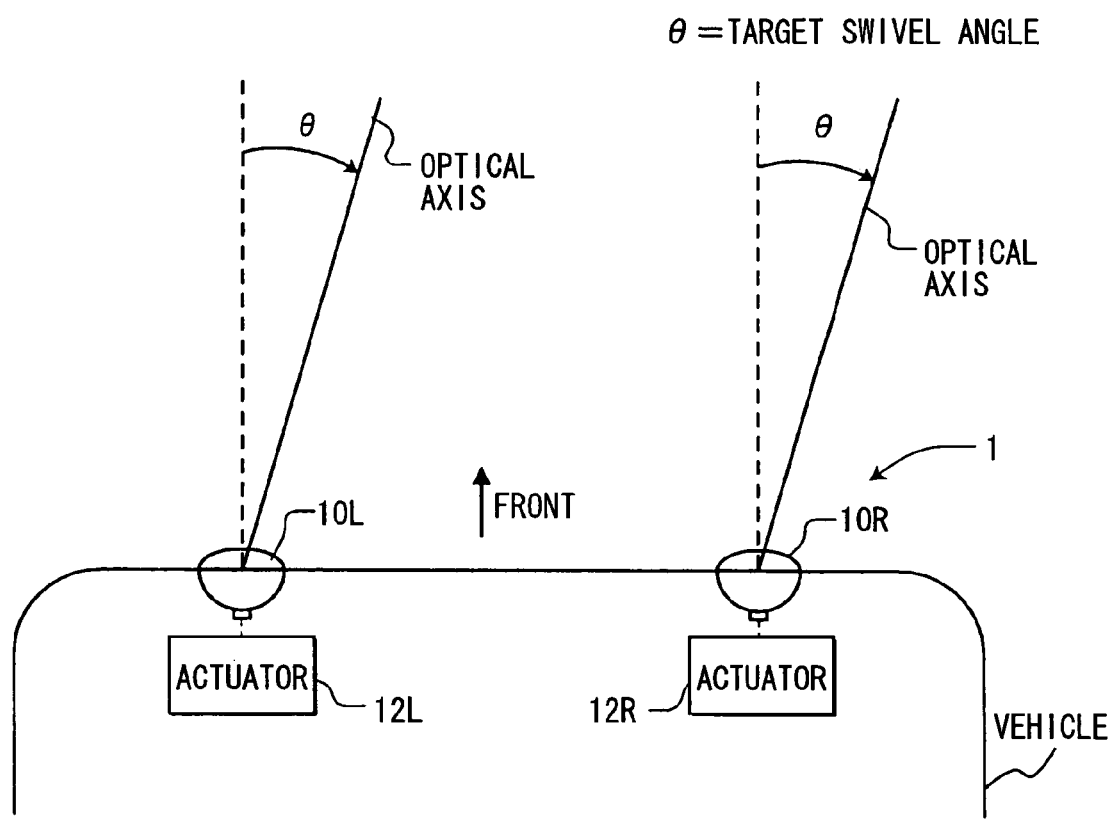
FIG. 3 is a schematic diagram showing an example of a change of an optical axis of a headlight driven by an actuator.

Next, the control process of the vehicle headlight apparatus 1 performed by the CPU 21 of the ECU 20 will be described with reference to FIGS. 2 and 3. A dashed line in FIG. 3 indicates the longitudinal direction (fore-and-aft direction) of the vehicle. A control program described as a flowchart in FIG. 2 is stored in the ROM 22. The CPU 21 reads the control program from the ROM 22 to execute the program.

In the flowchart shown in FIG. 2, at step 1, the target swivel angle $\theta$ is computed based on the vehicle speed supplied by the speed sensor 14 and the steering angle supplied by the steering angle sensor 16 (hereinafter, step 1 is abbreviated as S1, and other steps will be similarly abbreviated).

Next, at S2, it is determined whether the headlamps 10L, 10R have been turned on based on the output signal supplied by the headlamp light switch 17. When it is determined at S2 that the headlamps 10L, 10R have been turned on (Yes at S2), the actuators 12L, 12R are driven based on the target swivel angle $\theta$ at S3 as shown in FIG. 3 (i.e., the actuators 12L, 12R are driven such that the angle between the optical axis of the headlamp and the longitudinal axis of the vehicle is set at the target swivel angle $\theta$).

When it is determined at S2 that the headlamps 10L, 10R have not been turned on (NO at S2), at S4, it is determined whether the navigation device 30 has detected the dark road section, which is located ahead of the estimated traveling position of the vehicle. When it is determined at S4 that the dark road section located ahead of the estimated traveling position of the vehicle has not been detected (NO at S4), the actuators 12L, 12R are driven at S6 such that the headlamps 10L, 10R faces an ahead of the vehicle at S6 (i.e., the optical axes of the headlamps 10L, 10R extend in the longitudinal direction of the vehicle).

When it is determined at S4 that the dark road section located ahead of the estimated traveling position of the vehicle has been detected (YES at S4), it is determined at S5 whether an elapsed time, which is a period of time since time of that the dark road section is detected, is equal to or larger than a certain period of time. When the elapsed time is less than the certain period of time (NO at S5), the actuators 12L, 12R are driven at S3 such that the angle between the optical axis of the headlamp and the longitudinal axis of the vehicle corresponds to the target swivel angle $\theta$ (see FIG. 3). The certain period of time may be, for example, set at about several seconds.

When the elapsed time since the time of detecting the dark road section ahead of the vehicle is equal to or larger than the certain period of time (YES at S5), the actuators 12L, 12R are driven at S6 such that the headlamps 10L, 10R face the ahead of the vehicle (i.e., the optical axes of the headlamps 10L, 10R extend in the longitudinal direction of the vehicle).

Here, steps S1 through S6 serve as a swivel controlling means of the present invention.

Figure 4:
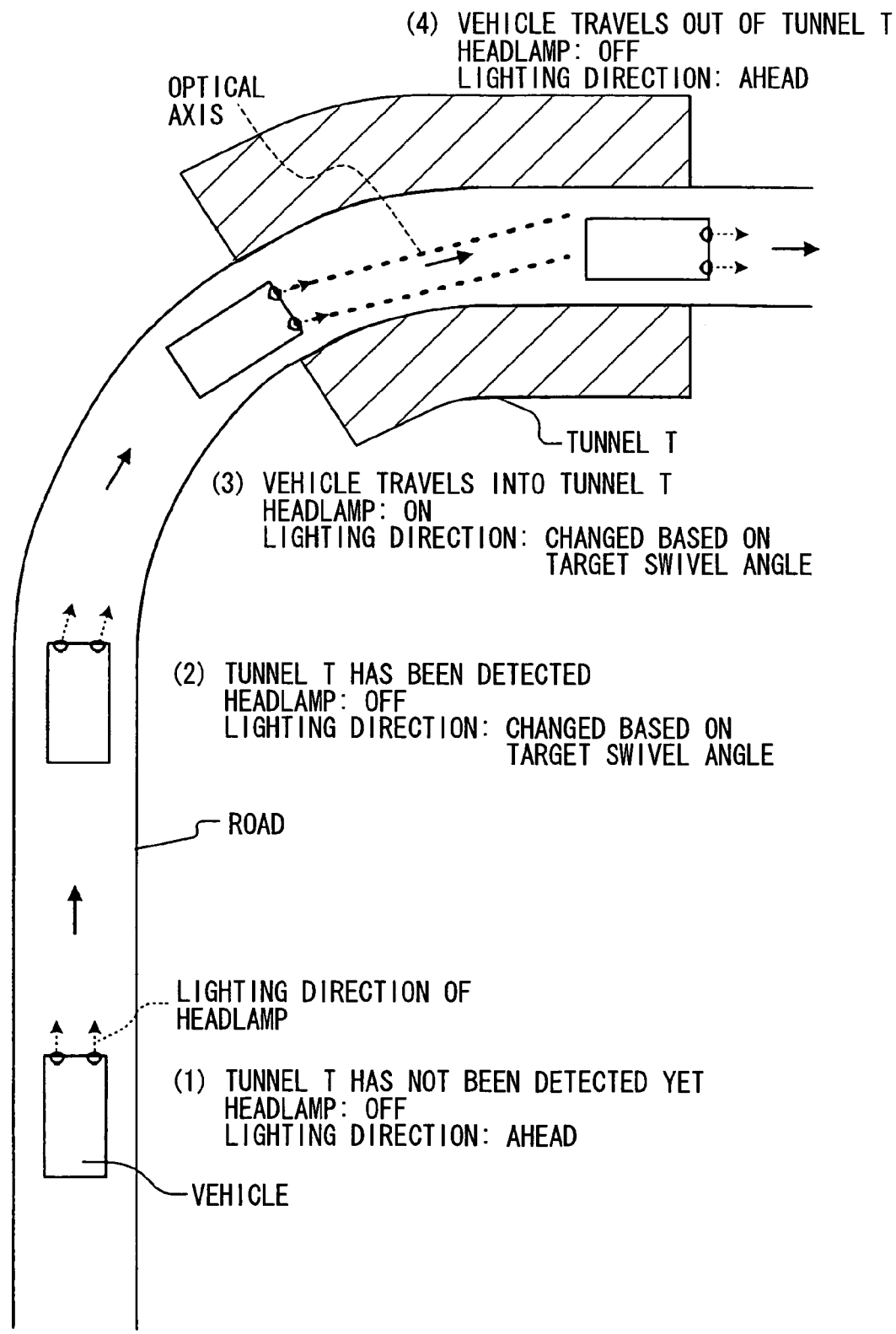
FIG. 4 is a schematic diagram showing operating conditions of the headlight and the actuator when the vehicle passes through a tunnel.

Next, with reference to a schematic diagram of FIG. 4, there will be explained a change of a condition of the headlamps in the case of that the vehicle passes through a tunnel T in a daytime. Here, numerals S1 to S6 in the explanation correspond to steps 1 to 6 in FIG. 2.

Firstly, at (1), where the vehicle is on the way to the tunnel T, the headlamps 10L, 10R of the vehicle has been turned off, because the degree of brightness in the travel environment is substantially high. Also, because the navigation device 30 has not detected the dark road section located ahead of the estimated traveling position of the vehicle, the actuators 12L, 12R are driven such that the headlamps 10L, 10R faces the ahead of the vehicle.

At (2), where the vehicle has reached a predetermined distance (e.g., 150 m) frontward from the tunnel T (i.e., the vehicle is located on an upstream side of the tunnel by the predetermined distance in the traveling direction of the vehicle), the navigation device 30 detects the dark road section located ahead of the estimated traveling position of the vehicle at S2. Then, the actuators 12L, 12R are driven such that the angle between the optical axis of the headlamp and the longitudinal axis of the vehicle corresponds to the target swivel angle $\theta$ at S3 (see FIG. 3).

At (3), where the vehicle travels into the tunnel T, the illumination sensor 11 detects that the degree of brightness becomes a predetermined value so that the headlamps 10L, 10R are automatically turned on by the headlamp light switch 17. At this time, because the actuator 12L, 12R has been already driven such that the angle between the optical axis of the headlamp and the longitudinal axis of the vehicle corresponds to the target swivel angle $\theta$, a sudden change (movement) of the direction of the optical axis at the time of lighting the headlamps 10L, 10R is limited. Therefore, the occupant is limited from feeling wrongness due to the sudden change.

At (4), where the vehicle travels out of the tunnel T, the illumination sensor 11 detects that the degree of brightness becomes more than the predetermined value so that the headlamps 10L, 10R are automatically turned off by the headlamp light switch 17. Also, because the navigation device 30 has not detected the dark road section located ahead of the estimated traveling position of the vehicle, the actuators 12L, 12R at S6 are driven such that the headlamps 10L, 10R faces the ahead of the vehicle.

As it is clearly seen in the above description, in the present embodiment, when the headlamps 10L, 10R are turned on during a night travel or the travel on the dark road section, such as the tunnel, the actuators 12L, 12R are driven based on the target swivel angle θ, which is determined based on the travel condition (e.g., the vehicle speed, the steering angle). Thus, the optical axes of the headlamps 10L, 10R are adjusted in the direction of the visual axis of the occupant. In contrast, even at the time of that the headlamps 10L, 10R have been turned off, the actuators 12L, 12R are driven based on the target swivel angle θ when the navigation device 30 detects the dark road section located ahead of the vehicle. Here, the dark road section is the segment of the road with a predetermined darkness, and the segment of the road extends the predetermined distance. When the vehicle travels into the dark road section, such as the tunnel, the headlamps 10L, 10R are automatically turned on. At this time, the actuators 12L, 12R have been already driven based on the target swivel angle θ so that the sudden change (movement) of the direction the optical axes of the headlamps 10L, 10R at the time of lighting the headlamps 10L, 10R is limited. Therefore, the occupant is limited from feeling the wrongness.

Also, in a case of that the headlamps 10L, 10R have been turned off and that the certain period of time has elapsed since the navigation device 30 detected the dark road section located ahead of the vehicle, the actuators 12L, 12R are driven such that the headlamps 10L, 10R are set at normal positions (i.e., the headlamps face the ahead of the vehicle). The above case corresponds to, for example, a case, where the vehicle has stopped at a position frontward from the dark road section located ahead of the vehicle.

Also, because the navigation device 30 serves to detect the dark road section located ahead of the vehicle, the dark road section, such as the tunnel, the underpass of the overhead crossing, the underpass of the bridge, can be detected with a high degree of accuracy based on the prestored road information, which is prestored in the navigation device 30.

Second Embodiment

Next, a vehicle headlight apparatus 101 of the second embodiment of the present invention will be described with reference to FIG. 5. Similar components of the vehicle headlight apparatus of the second embodiment, which are similar to the components of the vehicle headlight apparatus of the first embodiment, will be indicated by the same numerals. Explanation of the similar components will be omitted.

In the above first embodiment, the navigation device 30 serves as the dark road section detecting means, which detects the dark road section located ahead of the vehicle. However, the vehicle headlight apparatus 101 of the present embodiment utilizes image recognition to detect the dark road section located ahead of the vehicle.

Figure 5:
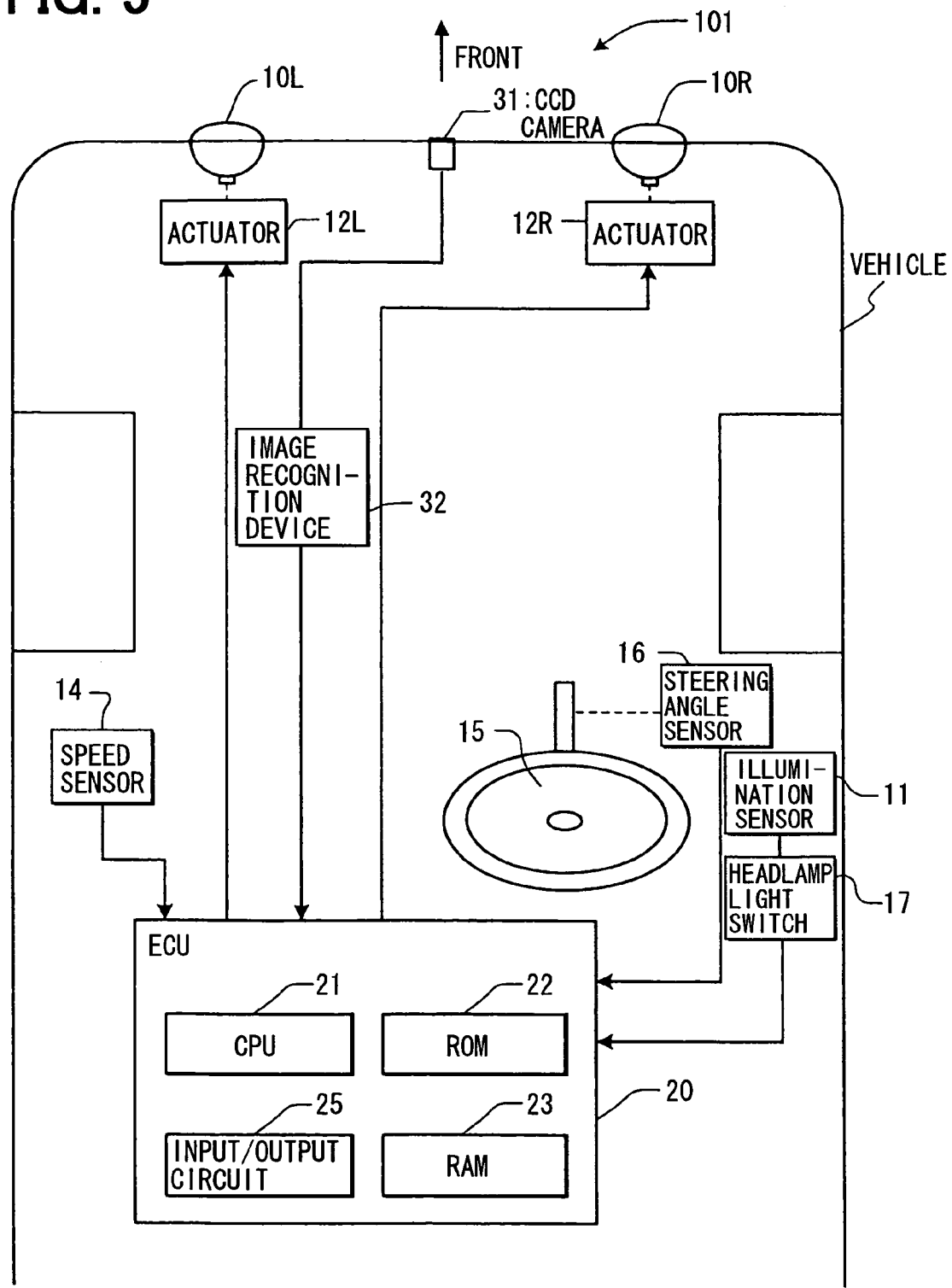
FIG. 5 is a block diagram showing a system structure of a vehicle headlight apparatus of a second embodiment of the present invention.

As shown in FIG. 5, the vehicle headlight apparatus 101 includes a charge coupled device (CCD) camera 31 and an image recognition device 32 alternatively to the navigation device 30 of the first embodiment. The CCD camera 31 serves as an imaging device of the present invention.

The CCD camera 31 is arranged between the headlamps 10L, 10R that are provided on a front portion of the vehicle, and captures an image ahead of the vehicle (i.e., image of the downstream side of the current position of the vehicle in the traveling direction) to output the captured image.

The image recognition device 32 is electrically connected with the CCD camera 31. The image recognition device 32 includes a CPU, a ROM, a RAM and an input/output circuit, all of which are not shown. When the image recognition device 32 receives the captured image data ahead of the vehicle from the CCD camera 31, the captured image data is transmitted to the RAM. A dark road section recognition program for recognizing images, the program being stored in the ROM, is executed such that the dark road section (e.g., a tunnel) is detected based on the image processing of the captured image.

The detection result by the image recognition device 32 is inputted to the ECU 20, and then the flowchart shown in FIG. 2 is executed. Therefore, also in the present embodiment, at the time of that the vehicle travels into the dark road section, such as the tunnel, and that the headlamps 10L, 10R have been turned on, the actuators 12L, 12R will have been already driven based on the target swivel angle θ, which is determined based on the travel condition of the vehicle. Thus, the sudden change of the direction of the optical axes of the headlamps 10L, 10R at the time of turning on the headlamps 10L, 10R is limited. Thus, the occupant is limited from feeing the wrongness.

In the present embodiment, even in a case of that the vehicle travels on a hidden dark road section, which is not indicated by the road information stored in the navigation device 30, the hidden dark road section, such as the tunnel, located ahead of the vehicle can be reliably detected. Here, the hidden dark road section, which is not indicated by the road information, includes a newly opened tunnel.

Here, additional advantages and modifications will readily occur to those skilled in the art. The invention in its broader terms is therefore not limited to the specific details, representative apparatus, and illustrative examples shown and described.

For example, in the above embodiments, the headlamps 10L, 10R are automatically turned on or off in response to the degree of brightness sensed through the illumination sensor 11. However, the headlamp light switch 17 may be manually turned on or off such that the headlamps 10L, 10R are turned on or off.

The present invention can be applied to a vehicle headlight apparatus, which can perform a swivel operation that changes an optical axis of a headlight in a horizontal direction correspondingly to a steering operation.

What is claimed is:

1. A vehicle headlight apparatus, comprising:
   a headlight that lights a downstream side of a current position of a vehicle in a traveling direction of the vehicle;
   an actuator that horizontally changes a lighting direction of the headlight;
   a swivel controlling means for driving the actuator; and
   a dark road section detecting means for detecting a dark road section located on the downstream side of the current position, wherein a dark road section is a segment of road with a predetermined darkness, the segment of the road extending for a predetermined distance; wherein:
   the swivel controlling means drives the actuator such that the actuator horizontally changes the lighting direction of the headlight based on a target swivel angle that is determined based on a travel condition, if the dark road section detecting means detects a dark road section located on the downstream side of the current position of the vehicle, even when the headlight is off.

2. The vehicle headlight apparatus according to claim 1, wherein: an angle between the lighting direction of the headlight and a longitudinal direction of the vehicle is set at the target swivel angle when the actuator horizontally changes the lighting direction of the headlight based on the target swivel angle.

3. The vehicle headlight apparatus according to claim 1, further comprising:
an elapsed time computing means for computing an elapsed time since time of that the dark road section detecting means detects the dark road section, wherein:
the swivel controlling means drives the actuator such that the actuator horizontally changes the lighting direction of the headlight based on a longitudinal direction of the vehicle when both of the following conditions are satisfied:
the headlight is off; and
the elapsed time computed by the elapsed time computing means is equal to or larger than a predetermined elapsed time.

4. The vehicle headlight apparatus according to claim 3, wherein: the lighting direction of the headlight extends in the longitudinal direction of the vehicle when the actuator horizontally changes the lighting direction of the headlight based on the longitudinal direction of the vehicle.

5. The vehicle headlight apparatus according to claim 1, wherein: the dark road section detecting means is a navigation device that prestores road information, the road information including a location of the dark road section; the navigation device computes the current position of the vehicle; and the navigation device detects the dark road section, which is located on the downstream side of the computed current position of the vehicle.

6. The vehicle headlight apparatus according to claim 5, wherein: the navigation device detects the dark road section based on the road information, which is prestored in the navigation device.

7. The vehicle headlight apparatus according to claim 1, wherein: the dark road section detecting means includes: an imaging device that captures an image of the downstream side of the current position of the vehicle; and an image recognition device that performs image recognition based on the captured image captured by the imaging device such that the image recognition device detects an image of the dark road section in the captured image.

8. The vehicle headlight apparatus according to claim 1, further comprising: an illumination sensing means for sensing a degree of brightness in a travel environment of the vehicle; and an automatic light controlling means for automatically turning on or off the headlight in response to the degree of brightness sensed by the illumination sensing means.

9. The vehicle headlight apparatus according to claim 1, wherein: the dark road section includes one of a road in a tunnel, an underpass of a bridge and an underpass of an overhead crossing.

10. A control system for a vehicle headlight apparatus, wherein the vehicle headlight apparatus has an actuator operable to horizontally change a lighting direction of a headlight of a vehicle, the control system comprising:
a swivel controlling means for generating a signal to control the actuator; and
a dark road section detecting means for detecting a dark road section located on a downstream side of a current position of the vehicle in a traveling direction of the vehicle, wherein:
the swivel controlling means is operable to control the actuator such that the actuator horizontally changes the lighting direction of the headlight based on a target swivel angle that is determined based on a travel condition, if the dark road section detecting means detects a dark road section located on the downstream side of the current position of the vehicle, even when the headlight is off.

11. The control system according to claim 10, wherein the swivel controlling means is operable to generate the signal to control the actuator to set an angle between the lighting direction of the headlight and a longitudinal direction of the vehicle to the target swivel angle when the actuator horizontally changes the lighting direction of the headlight based on the target swivel angle.

12. The control system according to claim 10, further comprising:
an elapsed time computing means for computing an elapsed time since a time at which the dark road section detecting means last detected a dark road section, wherein:
the swivel controlling means is operable to control the actuator such that the actuator horizontally changes the lighting direction of the headlight based on a longitudinal direction of the vehicle when both the following conditions are satisfied:
the headlight is off; and
the elapsed time computed by the elapsed time computing means is equal to or larger than a predetermined elapsed time.

13. The control system according to claim 12, wherein the lighting direction of the headlight extends in the longitudinal direction of the vehicle when the actuator horizontally changes the lighting direction of the headlight based on the longitudinal direction of the vehicle.

14. The control system according to claim 10, wherein:
the dark road section detecting means pre-stores road information, which includes a location of a dark road section;
the dark road section detecting means computes the current position of the vehicle; and
the dark road section detecting means detects a dark road section located on the downstream side of the computed current position of the vehicle.

15. The control system according to claim 14, wherein the dark road section detecting means detects a dark road section based on the road information that is pre-stored in the dark road section detecting means.

16. The control system according to claim 10, further comprising an automatic light controlling means for automatically turning on and off the headlight in response to a degree of brightness in a travel environment.

17. The control system according to claim 10, wherein a dark road section is one of a road in a tunnel, an underpass of a bridge and an underpass of an overhead crossing.

18. The control system according to claim 10, wherein a dark road section is a segment of road with a predetermined darkness, the segment of road extending for a predetermined distance.

19. A control system for a vehicle headlight apparatus, the vehicle headlight apparatus including an actuator operable to change a horizontal lighting direction of a headlight of a vehicle, the control system comprising:

a swivel controller operable to generate a control signal to control the actuator; and a dark road section detector operable to detect a dark road section located on a downstream side of a current position of the vehicle in a traveling direction of the vehicle, wherein the control signal generated by the swivel controller is adapted to control the actuator to horizontally change the lighting direction of the headlight based on a target swivel angle that is determined based on a travel condition, and wherein the swivel controller generates said control signal to control the actuator to horizontally change the lighting direction of the headlight based on the target swivel angle if the dark road section detector detects a dark road section that is located downstream of the current position of the vehicle at a time when the vehicle has not yet entered the dark road section, even when the headlight is off.

20. The control system according to claim 19, wherein the control signal generated by the swivel controller is adapted to control the actuator to set an angle between the lighting direction of the headlight and a longitudinal direction of the vehicle to the target swivel angle when the actuator horizontally changes the lighting direction of the headlight based on the target swivel angle.

21. The control system according to claim 19, further comprising:

an elapsed time timer operable to measure an elapsed time since a time at which the dark road section detector has detected a dark road section, wherein the swivel controller is operable to generate the control signal that controls the actuator such that the actuator horizontally changes the lighting direction of the headlight based on longitudinal direction of the vehicle when both the following conditions are satisfied:

the headlight is off; and the elapsed time measured by the elapsed time timer is equal to or larger than a predetermined elapsed time.

22. The control system according to claim 21, wherein the lighting direction of the headlight extends in the longitudinal direction of the vehicle when the actuator horizontally changes the lighting direction of the headlight based on the longitudinal direction of the vehicle.

23. The control system according to claim 19, wherein:

the dark road section detector pre-stores road information, which includes a location of a dark road section;

the dark road section detector computes the current position of the vehicle; and the dark road section detector detects a dark road section located on the downstream side of the computed current position of the vehicle.

24. The control system according to claim 23, wherein the dark road section detector detects a dark road section based on the pre-stored information.

25. The control system according to claim 19, further comprising an automatic light controller operable to automatically switch the headlight on and off in response to a degree of brightness in a travel environment.

26. The control system according to claim 19, wherein a detected dark road section detected by the dark road section detector is one of a road in a tunnel, an underpass of a bridge, and an underpass of an overhead crossing.

27. The control system according to claim 19, wherein a dark road section is segment of road with a predetermined darkness, the segment of road extending for a predetermined distance.

28. The control system according to claim 19, wherein the dark road section detector includes a global positioning system (GPS) receiver.

29. The control system according to claim 19, wherein the dark road section detector includes a light sensor disposed to receive light from a forward direction in the traveling direction of the vehicle.

30. The control system according to claim 29, wherein the light sensor is a CCD camera.

* * * * *